Feb. 23, 1960
E. C. HALLMAN
2,925,901
REVERSIBLE EXTENSIBLE BELT CONVEYOR
Filed July 14, 1955
4 Sheets-Sheet 1
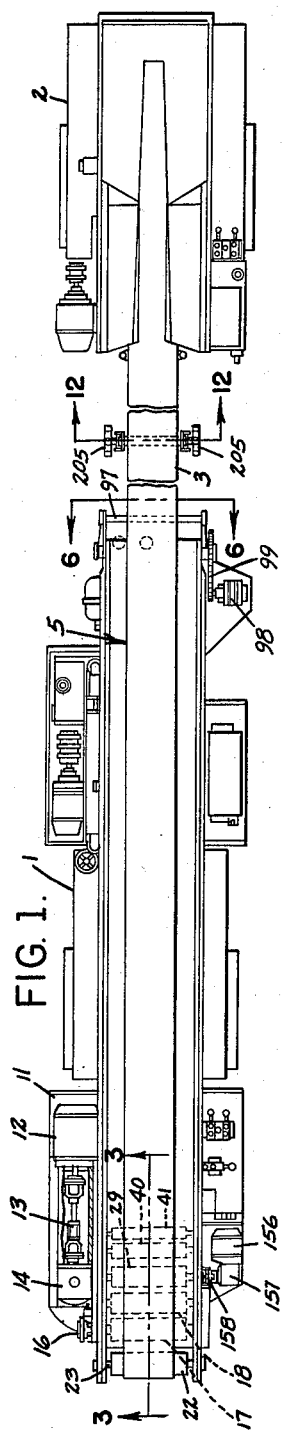
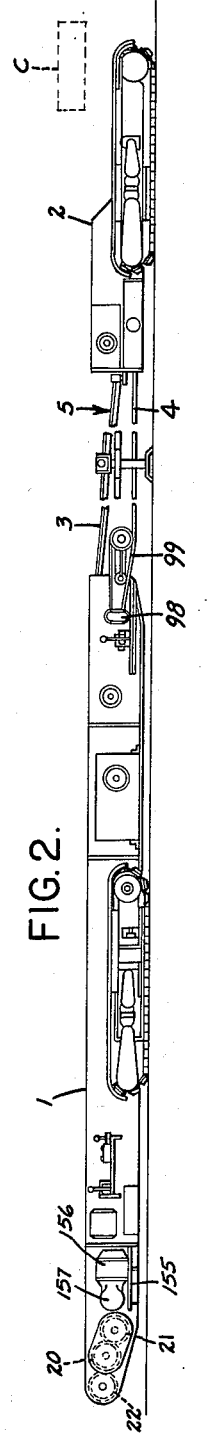
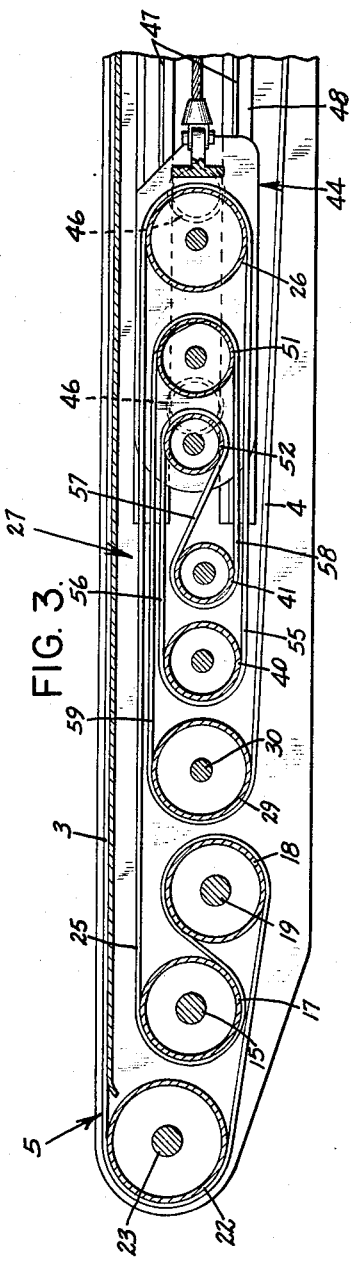
INVENTOR:
EDWARD C. HALLMAN
BY
ATTORNEY Feb. 23, 1960     E. C. HALLMAN     2,925,901
REVERSIBLE EXTENSIBLE BELT CONVEYOR
Filed July 14, 1955     4 Sheets-Sheet 2
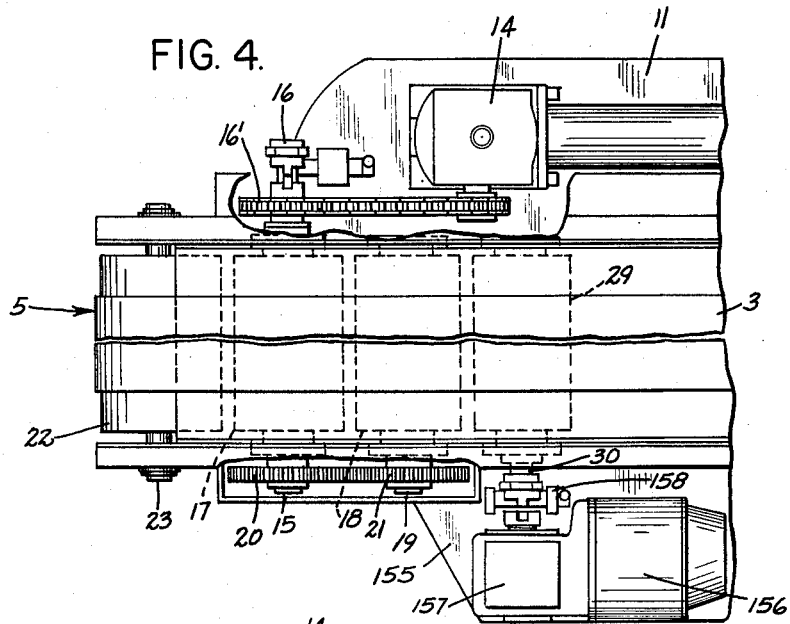
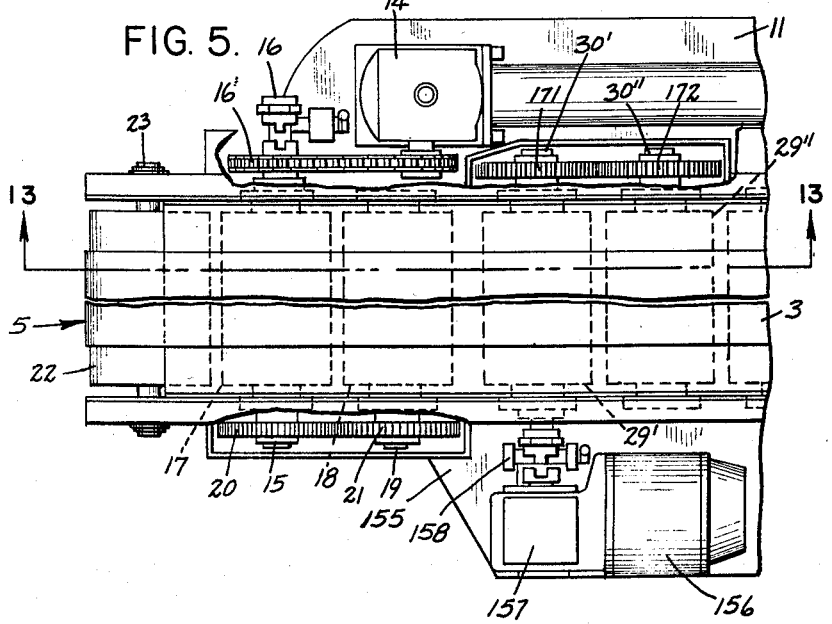
INVENTOR:
EDWARD C. HALLMAN
BY
ATTORNEY Feb. 23, 1960   E. C. HALLMAN   2,925,901
REVERSIBLE EXTENSIBLE BELT CONVEYOR
Filed July 14, 1955   4 Sheets-Sheet 3

INVENTOR:
EDWARD C. HALLMAN
BY
*Louis A. Maxson*
ATTORNEY

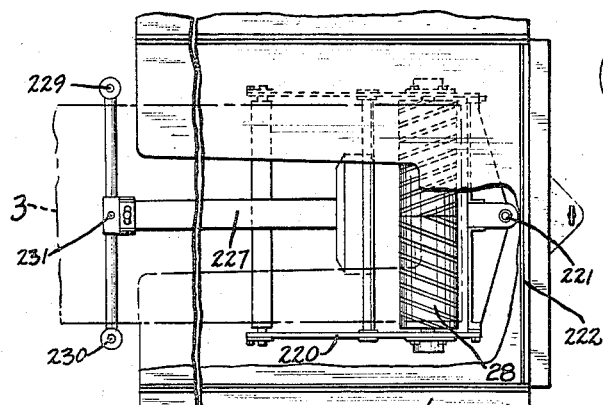
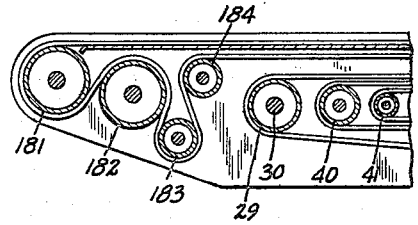
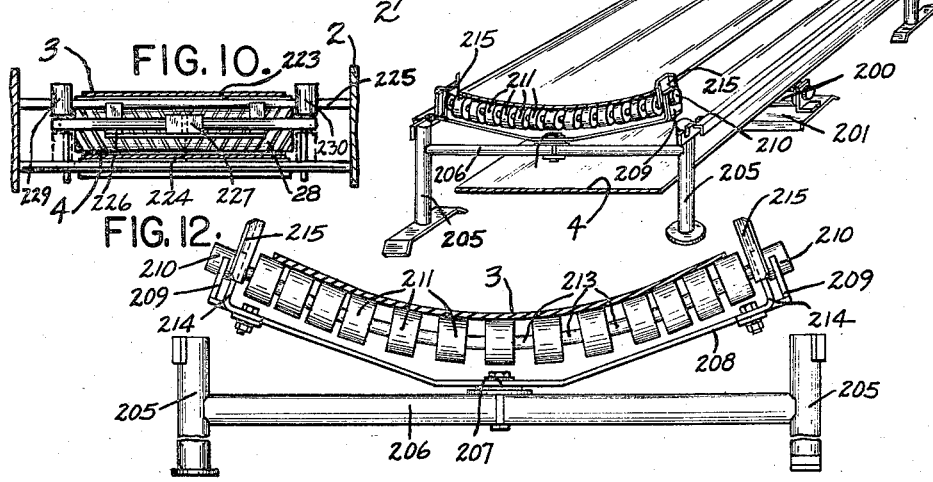
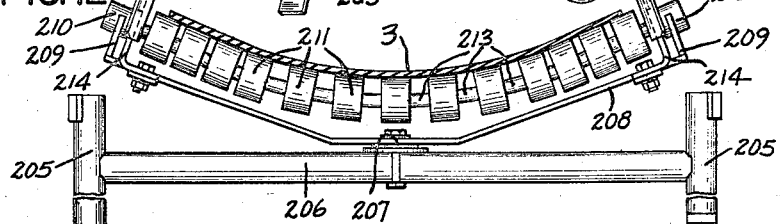
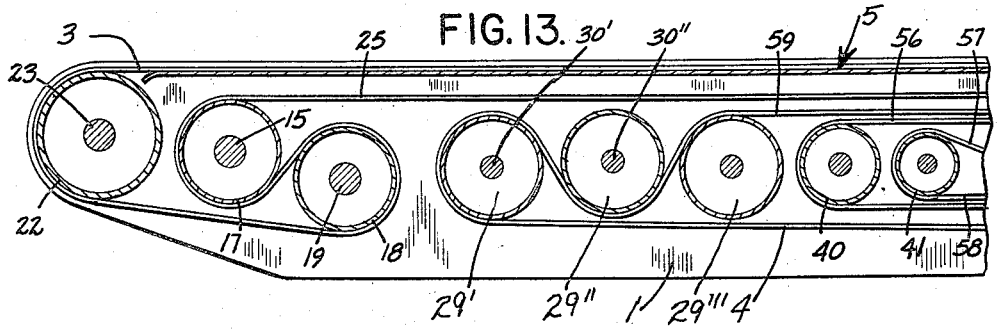

2,925,901

REVERSIBLE EXTENSIBLE BELT CONVEYOR

Edward C. Hallman, Barnesboro, Pa., assignor to Joy Manufacturing Company, Pittsburgh, Pa., a corporation of Pennsylvania Application July 14, 1955, Serial No. 522,059

15 Claims. (Cl. 198—139)

My invention relates to extensible belt conveyor devices and more particularly to improvements in such devices whereby the belt thereof may be used not only for the carrying out of material from a progressively extended entry or the like, but also employed from time to time to carry in an inbye direction, and to points adjacent the working face, or some other desirable place, supplies, etc.

A well known extensible belt conveyor includes two self-propelled vehicles, a larger, rearward one called a drive buggy and a smaller, forward one called a take-up buggy. In this apparatus the forward end of a continuous loop of conveyor belt extends around a forward roll or pulley on the take-up buggy and the forward portion of the upper active, outwardly moving belt run is arranged to receive material, for example, from such devices as a continuous miner, etc. The upper active run of the conveyor belt extends back from the take-up buggy to the drive buggy and is suitably guided and supported on the latter, and, preferably at the extreme rear end of the drive buggy, there is arranged a reversing idler roll or pulley over which the top run of the belt passes and discharges material, while forward of this reversing idler there is a drive roll arrangement to and around which the conveyor belt extends after leaving the reversing idler roll or pulley. Otherwise viewed, it may be said that the top run of the belt is adapted to be connected in traction relation with the drive roll arrangement. If desired, the separate idler roll or pulley may be dispensed with and the so-called "tandem" pulley arrangement be located at the rear of the drive buggy and have the top run of the belt pass directly to it. The top run of the belt may discharge at the rear end of the drive buggy onto any suitable conveyor system or device. The belt passes forward, after leaving the drive roll arrangement, over an arrangement for storing and paying out inversely varying portions of the conveying belt, which arrangement comprises, in a preferred form, rolls or pulleys rotated on axes stationary with respect to the drive buggy and other rolls or pulleys journaled on a carriage which is movable toward and from the stationarily journaled rolls just mentioned.

There is means for automatically controlling the position of the movable carriage, so that the latter may approach the rolls or pulleys which turn on axes fixed relative to the drive buggy, as the take-up buggy moves away from the drive buggy, and for automatically moving the carriage supported rolls or pulleys away from the others as the take-up buggy moves back toward the drive buggy.

So far as I am advised, heretofore devices of the character mentioned were of primary utility in providing for the removal of material from adjacency to a working face to a point remote from the face, and were not adapted to alternative use for carrying supplies, materials, etc. from an outbye point to the neighborhood of the working face. However, I have found that it is practicable, by appropriate arrangement of parts and drives therefor, and tensioning means for the belt storage and take-up devices capable of exerting appropriate force, to employ the same extensible belt arrangement which functions for the outward removal of material, to transport supplies, etc. inwardly when desired.

In a preferred embodiment of a reversible extensible belt conveyor embodying my present invention there are provided two frames between which movements of approach and separation are adapted to be effected. One of these frames carries a belt driving and extension or take-up unit and the other a tail pulley. When used in mining, the frame carrying the belt-driving and extension or take-up unit may suitably be called a drive buggy, and the one carrying the tail pulley may be designated as a take-up buggy. The belt-driving and extension or take-up unit may desirably have at its outbye end a belt-reversing pulley or idler over the top of which material carried in an outbye direction by an endless belt is discharged, and desirably just inbye of this belt-reversing pulley is a belt drive normally operative to exert traction on the upper run of the belt in a direction to cause the upper run of the latter to move in the outbye direction. From the belt drive the belt goes to a variable storage arrangement and is passed back and forth between idlers or pulleys of such number and disposition that storage and paying out of a considerable length of belt is possible. This belt storage arrangement includes at least one, and preferably several, pulleys or idlers carried on a carriage reciprocably mounted on the frame which supports the belt-driving and extension or take-up unit, and also at least one, and preferably several, pulleys or idlers rotatable on axes which are stationary with respect to the frame just mentioned. Desirably a run of belt extends from the belt drive forwardly (inbye) to a carriage-mounted pulley or idler; and another run, which constitutes the return strand of the belt and which extends all the way from the tail pulley, passes in an outbye direction to one of the pulleys or idlers that rotate on axes fixed with respect to the frame which carries the belt-driving and extension unit. Between the belt drive and the pulley or idler just mentioned which rotates on an axis fixed relative to the frame, there is reeved a portion of the belt which may vary widely in length. To aid in the reeving and storage of this portion of the belt there are, as noted, desirably provided additional pulleys or idlers on the carriage and other pulleys and idlers rotating on axes fixed relative to the frame. Means is provided for exerting when desired constantly a traction upon the carriage in a direction tending to cause it to move away from the group or cluster of pulleys rotating on axes turning on fixed axes on the frame, this yielding means being adapted to be overcome by movement apart of the drive and take-up buggies so that belt can be drawn out of the extension unit, and desirably arrangements are provided whereby upon movement of approach between the drive and take-up buggies such yielding means shall exert a sufficient force upon the carriage to cause the latter to draw into the belt storage arrangement all of the slack in the belt produced by such movement of approach and maintain the necessary tension in the belt strands which extend between the two buggies.

As earlier indicated, it is desirable not only to be able to effect circulation of the endless belt in a direction to cause its upper strand to carry material in an outbye direction, but also to be able at will to drive the endless belt in a direction so that the upper, usually outwardly moving carrying strand of the belt can be used to carry supplies and materials toward the working face, i.e., in an inbye direction.

I have found it to be possible to effect such a reverse drive of the carrying strand of the belt by disconnecting from the power source the main belt drive and effecting appropriate drive of one or more pulleys rotating on stationary axes on the drive buggy. If a single pulley is to be driven, a relatively high belt tension may be suitably provided, or additional pulleys rotating on stationary axes may be provided to give increased wrap if comparatively low belt tension is to be used, the carrying strand of the belt in either case being caused to travel in an inbye direction through traction transmitted to it by the return strand as the latter is drawn in an outbye direction.

If it be desired to convert an extensible conveyor of the type in which the upper run of the belt is commonly used only for moving material in an outbye direction, and not have to change the sizes of any of the pulleys in the automatic belt take-up and storage mechanism, it will be easy, if additional pressure should be needed between the belt and the idler which is to be driven by power to cause the upper belt run to convey material in an inbye direction, either to increase the pressure in the hydraulic jack associated with the belt take-up and storage mechanism or to increase the area upon which pressure fluid acts by using a larger jack, and thereby increasing the tension of the belt.

The principal object of the invention is to provide an improved extensible belt conveyor which incorporates means for selectively pulling the material-carrying strand of its endless belt either in an outbye direction or in an inbye direction, and to this end to provide an improved organization and arrangement of parts for the ready and facile accomplishment of this objective. Another object is to provide an improved selective drive for two alternatively effective belt driving arrangements each of which is adapted when operative to pull the upper active run of a closed belt loop in a desired direction, the directions being mutually opposite. A further object is to provide an improved arrangement for effecting outbye movement of the material carrying run of a belt loop which has extension and storage means associated with it, through the application to the belt of a circulating force through an element of the extension and storage means which performs only a belt guiding function when the belt is being driven by other, normally operative belt driving means which usually causes a belt circulation such that its active run moves in an outbye direction. Another object is to provide an improved belt storage and extension arrangement having associated therewith means whereby it can be caused to perform, when desired, a belt driving function. Another object still is to provide an improved selective reversible belt drive for a closed conveyor belt loop. It is also an object of the invention to provide an improved extensible belt apparatus in which rolls or pulleys contacting a belt loop at spaced points may be caused selectively to drive the belt. Still another object is to provide an improved belt type conveyor in which a roll normally playing only a belt guiding function can at will be caused to become a belt driving element, and the normal drive means for the belt be disconnected. Other objects and advantages of the invention will hereinafter appear.

Reference may now be had to the drawings for a description of a preferred embodiment of the invention.

In the drawings:

Fig. 1 is a plan view, with parts broken away, of a drive and take-up buggy mechanism of the character described, in which the illustrative embodiment of the invention is incorporated.

Fig. 2 is a side elevational view of the structure shown in Fig. 1.

Fig. 3 is an enlarged longitudinal vertical central sectional view taken on the line 3—3 of Fig. 1.

Fig. 4 is a fragmentary plan view, on an enlarged scale, and with parts broken away to show details of construction and other parts omitted, of the outbye end of a drive buggy incorporating the improved reverse drive.

Fig. 5 is a corresponding view, showing a modification.

Fig. 9 is an enlarged fragmentary plan view of a take-up buggy, showing the belt training mechanism and tail pulley associated therewith.

Fig. 10 is an end view from an outbye position with respect to it, of the tail pulley, etc. of the take-up buggy.

Fig. 11 is a perspective view showing a portion of the supporting arrangement for the belt between the buggies.

Fig. 12 is an enlarged transverse sectional view taken on the line 12—12 of Fig. 1, showing one of the reversible self-training idler units that is used in supporting and training the upper run of the belt located between the buggies.

Fig. 13 is an enlarged longitudinal sectional view on the plane of the line 13—13 of Fig. 5, showing a modified pulley arrangement for a drive buggy; and Fig. 14 is another, somewhat smaller, longitudinal sectional view showing another pulley arrangement for a drive buggy.

Figure 6:
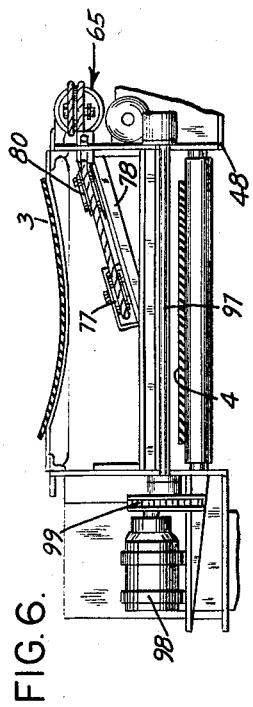
Fig. 6 is a vertical transverse section, on the plane of the line 6—6 of Fig. 1, with parts broken away, showing the end of the drive buggy which is nearer the take-up buggy.

Referring now to the drawings, and first to Figs. 1 and 2, it will be noted that a drive buggy 1 and a take-up buggy 2 are connected by an active run 3 and a return run 4 of a continuous conveyor belt loop generally designated 5, and that the take-up buggy as shown is adapted to follow closely behind a continuous miner, of which only a portion of the delivery conveyor is indicated in Fig. 2 at C, and to receive material discharged by this delivery conveyor. Both the drive buggy 1 and the take-up buggy 2 are shown as of the self-propelled type, but these mechanisms, except as will be done hereinafter, need not be illustrated in any detail here.

Referring now to Figs. 1, 3 and 4, it will be seen that upon a platform 11 mounted at the left-hand side (looking in an inbye direction) of the rear end of the drive buggy 1 there is a motor 12 which is connected through an extensible universal drive connection 13 with a suitable reduction gearing 14. This reduction gearing is adapted to drive a shaft 15 through a clutch 16 herein shown as manually controlled and whose driving element is driven through a chain-and-sprocket drive 16′ actuated by the reduction gearing. The shaft 15 has mounted upon and fixed to it a suitably lagged belt drive roll 17, and a second suitably lagged drive roll 18 is associated with the drive roll 17. The roll 18 has a supporting and driving shaft 19, and the shafts 15 and 19 are connected as indicated in Fig. 4 by spur gears 20 and 21 meshing with each other and respectively mounted on the shafts 15 and 19. The top run 3 of the belt, after passing along the top of the drive buggy, which is provided with suitable supporting means therefor, passes around a reversing roll or head pulley 22 supported by a shaft 23 near the rearward or outbye end of the drive buggy, and the belt 5 passes forwardly from the lower side of the roll 22, up around the forward (inbye) side of the drive roll 18, rearwardly and downwardly beneath the drive roll 17 and then upward again over the drive roll 17 and then forward in a run 25 to the first bodily movable element 26 of a belt take-up and extension system generally designated 27, from the final roll 29 of which the return run 4 of the belt 5 passes forwardly, and ultimately to a tail pulley 28 on the take-up buggy 2. The roll 29 may also serve as a belt drive roll and is mounted on a shaft 30 for rotation by the latter when the shaft 30 is power driven as will be described.

The belt take-up and extension system 27 includes as illustrated a series of rolls rotating on stationary axes, one of which, 29, has already been mentioned, and a series of belt-guiding and direction-reversing rolls, called a cluster for convenience, mounted on a moving carriage, and means for controlling and also for effecting movement of the carriage and cluster relative to the rolls which turn on stationary axes. In addition to the roll 29 journaled on a stationary axis there are two others 40 and 41, and these are mounted as shown on the drive buggy for rotation on axes lying in a plane parallel to the path of active run 3 of the belt along the top of the drive buggy. Roll 41 is of smaller diameter than roll 40, which is disposed between roll 41 and roll 29, and roll 40 is of smaller diameter than roll 29.

The movable carriage is designated 44 and is provided with wheels 46, 46 guided by and rolling along guide rails 47 on a frame section 48 of the drive buggy 1. As shown, the carriage 44 carries three guide rolls about which reversals of belt direction are adapted to take place. These rotate on axes fixed with respect to the carriage 44, but, as the carriage moves longitudinally of the frame section 48 of the drive buggy, the carriage supported rolls approach or move away from the rolls 29, 40 and 41. The rolls on the carriage include the roll 26, previously mentioned, and two others respectively numbered 51 and 52. The roll 51 is between the rolls 26 and 52. The diameters of rolls 26 and 29 are, as shown, the same except for the increase in diameter of 29 effected by the lagging later described. The diameters of rolls 40 and 51 are shown the same, and the diameters of the rolls 41 and 52 are shown the same. The axes of rotation of the rolls 29, 40 and 41 lie in a common plane which is, as shown, parallel to the active run 3 of the belt 5 as the latter passes along the top of the frame section 48. The axes of rotation of the rolls 26, 51 and 52 are in a common plane, which is shown as parallel to the active run 3 of the belt 5 as the latter passes along the top of the frame section 48. The plane in which the axes of rotation of the rolls 26, 51 and 52 lie is, as shown, slightly above the parallel plane in which the axes of the rolls 29, 40 and 41 lie.

In addition to the active and return runs of the belt 5, there are six strands or reaches of belt which have their lengths altered as there occurs relative movement of the carriage 44 along the guide rails 47. One of these strands is the belt section previously identified as 25, which extends from the drive roll 17 to the roll 26. The others are identified as follows (Fig. 3):

55 extending between rolls 26 and 40,
56 extending between rolls 40 and 52,
57 extending between rolls 52 and 41,
58 extending between rolls 41 and 51, and
59 extending between rolls 51 and 29.

When the carriage 44 moves from the position shown in Fig. 3 toward the right in that figure, substantially six times as much belt length as the distance the carriage moves must be drawn into the belt storing and paying out system, and, as such length may be supplied equally by the active and return runs 3 and 4 respectively of the belt, the take-up buggy, starting from a position at least as far from the drive buggy as three times the length of travel of the carriage 44 would have to move three times such distance towards the drive buggy 1 for the carriage to make the movement mentioned. On the other hand, the take-up buggy 2 can move away from the drive buggy three times as far as the carriage 44 moves, if the carriage moves from its extreme inbye position to the position shown in Fig. 3.

The carriage 44 may be caused to move to the left upon the drive buggy 1 by motion of the take-up buggy 2 away from the drive buggy but return of the take-up buggy toward the drive buggy will not itself effect the winding-in of the slack thereby produced.

Figure 7:
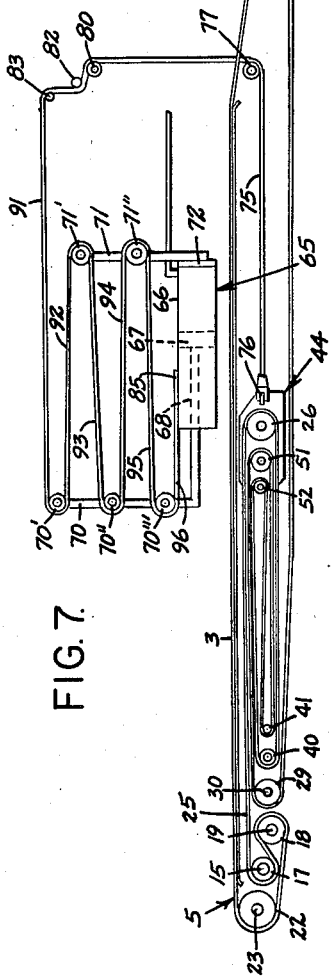
Fig. 7 is a diagrammatic view of the belt storing and extension arrangement.
Figure 8:
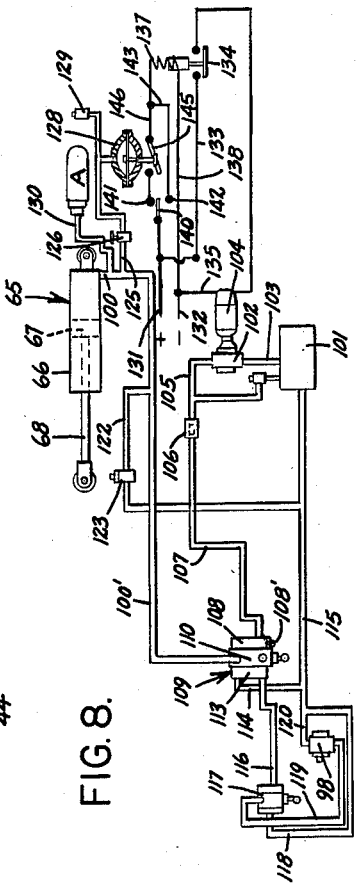
Fig. 8 is a diagrammatic view showing some of the details of the hydraulic system associated with the belt storing and paying out apparatus.

An appropriate arrangement for winding in such slack, for permitting the introduction of additional belting into the system, and for maintaining necessary tension in the belt system is illustrated in Figs. 7 and 8. A hydraulic cylinder and piston mechanism 65 is mounted at one side, herein the left-hand side looking forwardly, of the frame section 48, being secured to such frame section near its top and forwardly of its longitudinal center.

This cylinder and piston mechanism 65 is single acting and includes a cylinder 66, a piston 67, and a piston rod 68. The diameter of the cylinder and piston mechanism 66, 67 will be made great enough so that the tension of the belt will be sufficient, even with only 180° wrap about the pulley 29, to provide when the latter is positively driven by its shaft 30 as later described, adequate traction, when the pulley 29 is acting as a belt-driving element, to cause the belt to have its upper strand 3 operate effectively to convey material etc. in an inbye direction. It will be appreciated, however, that adequate friction between the pulley 29 and the belt can be obtained by using appropriate pressure in the cylinder 66, an appropriate cylinder diameter when lower cylinder pressure is desired, and in either case lagging, as with balata, obliquely wound, and turned smooth, will be of advantage.

A multiple (triple) block 70 diagrammatically shown in Fig. 7 is carried on the piston rod 68, and a multiple (double) block 71 is mounted on the head 72 of the cylinder 66. The cylinder and piston mechanism 65 has a cable section 75 associated with it. One end of this cable is attached, at what may be called its free end, to the forward end of the carriage 44, as at 76. From connection 76 the cable section 75 extends forwardly and around a pulley 77 journaled on an oblique element 78 carried by the frame 48 and located at the forward end of the latter (see Fig. 6). From the pulley 77 the cable section passes laterally to another pulley 80 rotatably supported for turning on an axis parallel to that of the pulley 77 and close to the left-hand side of the frame 48 looking forward. Next the cable section passes rearwardly about pulleys 82 and 83 which, so to speak, set it over laterally of the frame 48 to a position outside of the latter. From the pulley 83 the cable section 75 is passed around the blocks 70 and 71 and into cooperative relation with the mechanism 65 and finally has its remaining end fixed with respect to the cylinder 66 where it is connected as at 85. The multiple block 70 has its three sheaves individually identified by the reference characters 70', 70'' and 70'''. The sheaves of the multiple block 71 are individually identified by the reference characters 71' and 71''. The run of the cable passing initially rearwardly from the pulley 83 may be identified as 91. It passes rearwardly and around the pulley 70' and then continues as a forwardly extending run 92 to and around the pulley 71'. From the pulley 71' a run 93 extends rearwardly to and around the sheave 70''. After passing around the sheave 70'' the cable has a run 94 extending forward to the sheave 71'' and then there is a rearwardly extending run 95 passing to the sheave 70''', and from the latter a terminal portion 96 extends forwardly and is secured in fixed relation to the cylinder 66 at 85.

A shaft 97 is provided to receive a reel of or for belt and may be driven by a motor 98 through a chain and sprocket drive 99 when it is desired to remove a length of belt from the system, and an additional length of belt may be taken into the system by fluid pressure expansion of the belt storage apparatus.

Fig. 8 shows a combined hydraulic and electric system which may be used for automatically controlling the operation of the belt storage and extension mechanism so far described. The cylinder 66 is shown, and this, with its piston 67, will be referred to for convenience as the take-up jack.

Fluid is adapted to be supplied to and released from the take-up jack through a conduit 100. This has connected in communication with it an accumulator A, to provide a reservoir of fluid under pressure. A tank 101 for a hydraulic fluid is provided. A pump 102 has its intake connected by a conduit 103 with the tank. An electric driving motor 104 is provided for the pump, the control circuit for which motor will shortly be described. Motor 104 and pump 102 are supported on the drive buggy. Pump 102 has a discharge line 105 in which there is a check valve 106 which permits fluid to flow past it from the conduit 105, but which prevents reverse flow. Check valve 106 is connected by a conduit 107 with the supply box section 108 of a valve box structure 109 which, though in practice it may contain additional control valves, is shown, since that is all that is necessary for this case, with but a single control valve section 110. A discharge valve section 113 is also shown included in the valve box structure 109. The discharge section has a connection by a conduit 114, with an exhaust line 115 leading back to the tank and another, separated and non-communicating connection with a conduit 116 later mentioned again. The sections 108, 110 and 113 are of well-known commercial constructions. The supply section 108 has an associated relief valve 108', for relieving excess pressure through the sections 110 and 113 to the conduit 114. Section 110 has in it a valve (not shown) which permits free flow of fluid from conduit 107 to the further conduit 116 when the valve is in mid-position. In one shifted position this valve permits supply of fluid to a conduit 100' leading to the conduit 100 and cuts off flow beyond it to conduit 116; in another shifted position it connects conduit 100' to the conduit 114. When the valve in section 110 is in mid-position, pressure fluid is delivered to a conventional control valve box mechanism 117 containing a valve (not shown) which either lets fluid flow freely to a conduit 118 and through the latter to a vent line 115, or enables supply of fluid through a conduit 119 to the reel driving motor 98, whose discharge side is connected by a conduit 120 to the vent line 115. If the relief valve 108' opens due to excessive pressure in line 107, fluid is vented from the latter through the box structure 109 to the exhaust line 114, and, as above noted, fluid can be deliberately exhausted through the line 114 from line 100'.

Conduit 100' has a conduit 122, containing a pressure relief valve 123, leading back to the vent line 115. The relief valve 123 is set at the pressure normally desired in the take-up jack. Still another conduit 125 opens from the conduit 100, and this has a stop valve 126 in it between its connection with conduit 100 and a pressure responsive switch mechanism 128. A pressure gauge 129 is shown at the end of conduit 125. If the pressure in the conduit 100 tends to fall too low, the pressure responsive switch mechanism will effect starting of the motor 104. The accumulator A is connected by a conduit 130 with the conduit 100.

It will be noted that power lines 131 and 132 are connected, the one, 131, with a conductor 133 containing a motor starting switch 134 and leading to the pump motor 104 and the other, 132, with a connection 135 leading also to the pump motor 104. The switch 134 has an operating solenoid 137 connected by a conductor 138 with the power line 132 and is adapted to have its other end connected with the power line 131. Power line 131 has a selector switch 140 which is adapted to be moved selectively into contact with switch points 141 and 142. Switch point 142 is connected by conductor 143 with the end of the solenoid 137 which is not connected with the conductor 138. The pressure switch 128 has a switch element 145 which is adapted to establish and/or interrupt a circuit between thte switch point 141 and the end of the solenoid 137 to which the conductor 143 leads, this through another conductor 146. It will be observed that the switch 145 will be closed whenever the pressure in the line 100 falls below the desired lower value. It will be further observed that with proper positioning of the switch element 140, the pump motor 104 may be caused to drive the pump continuously. To do this the switch element 140 will be moved to contact the switch point 142.

It will be observed that the take-up jack may be manually controlled when the switch element 140 is engaged with the switch point 142, and will be under automatic control when the switch element 140 engages the switch point 141. Manual control of the take-up jack is desired: (1) when belt is to be threaded initially into the drive section, (2) when the cluster carriage is to be moved to effect the addition of belt to the system, and (3) if and when it is necessary to effect tensioning of the belt deliberately. Manual control will be accomplished by employing the selector switch 140 to prevent the pressure responsive switch device 128 from functioning to control the pump motor 104, and by manipulating the valve associated with valve box section 110. Performance of these three operations will extend the take-up jack and draw the cluster away from the stationary belt idlers, and the machine will be filled with belt, or the belt will be tensioned, whichever may be the function which needs to be performed.

To arrange the controls for what may be termed normal operation, that is so that belt may be drawn out under appropriate tension when extension of the conveyor length is needed, and so that belt tension will be automatically maintained if the take-up buggy is backed up for any reason, the following operations will be performed: The valve associated with valve box section 110 will be set to maintain a connection between conduit 107 and conduit 100'. The switch 140 will be moved into engagement with switch point 141, and control of the pump motor will be lodged in the pressure responsive device 128. The pump motor will not, with the structure so far described, be driven if the pressure in the take-up jack is at or above what is normal operating pressure. Driving of the take-up buggy ahead will increase this pressure, and the relief valve 123 will then let some oil flow out of the take-up jack and back to the tank. The cluster will thus be allowed to move in a direction to pay out belt. When the normal operating tension is once more restored, the relief valve 123 will close and the existing belt tension will be maintained essentially constant until it is necessary to extend the length of the conveyor again.

If the take-up buggy is backed with the pump 104 not running, belt tension may drop enough for the pressure in the take-up jack to drop to a value low enough to permit switch element 145 to close a circuit through the solenoid 137, and close the motor control switch 134 and start the pump motor 104, which will operate to restore pressure in the take-up jack. When the restored pressure in the take-up jack reaches the correct operating value, the pressure switch control device 128 will effect stopping of the pump motor, and the conveyor will again be in a position to pay out belt when the take-up buggy moves ahead. The device 128 is but diagrammatically illustrated in Fig. 8, it will be understood.

When the winding motor 98 is used to remove belt from the conveyor, the selector switch 140 will be moved to engage the switch point 142, causing the pump 104 to be driven and supply fluid under pressure as long as the switch 140 is in the position mentioned.

Referring now again to Figs. 3 and 4, it will be recalled that I have pointed out that, if there be established conditions for the exertion of an adequate traction on the return run 4 of the belt by the pulley 29, this pulley can, by the appropriate application of an adequate rotative force to it in a proper direction, be caused to exert a traction in an outbye direction on the return run 4 and this, at the other side of the idler pulley on the take-up buggy 2, will draw the upper run 3 of the belt loop in an inbye direction and enable the upper run to be used for conveying material, supplies, etc. to the working face or other desired positions inbye of the drive buggy. It is desirable that the rate of travel of the upper belt run during moving material in an inbye direction be on the order of one-half that when it is performing its regular conveying of material out from the face. To provide such rotation of the pulley 29, through rotation of its shaft 30, there is mounted on a shelf 155 secured to the right-hand side of the drive buggy 1 a motor 156 with a reduction gearing 157 driven thereby and connectible by a suitable clutch 158, herein shown as a manually operable clutch, with the shaft 30. The motor 156 and the reduction gearing are adapted to drive the shaft 30 in a clockwise direction as viewed in Fig. 3, from which it will be seen that the belt runs whose lengths are changed automatically during the operation of the belt storage and extension arrangement 27 all lie between the drive 17, 18 and the drive 29 and wholly at the lower tension side of both of them. It will be appreciated that the clutches 158 and 16 are not simultaneously in drive effecting position, as it is not desired to have either belt driving motor have to turn the other and the reduction gearing associated with the latter backwards.

It has been explained that with pulley 29 lagged as described, and with an 180° engagement with the return run 4 of the belt and with either a high enough hydraulic pressure in p.s.i.g. in the take-up jack or with a large enough cross-sectional area of the take-up jack, the pulley 29 can provide an effective and much to be desired reverse travel of the top run 3 of the belt under loaded conditions, but it will be appreciated that when overall length of the drive buggy is not a factor in the construction of the apparatus the roller 29 may have associated with it arrangements to provide increased belt wrap. Figs. 5 and 13 show one way this can be done, Fig. 5 showing drive details and Fig. 13 the belt reeve. Referring to these figures, it will be observed that the roll 29', which corresponds generally to the roll 29, and from which the return run of the belt loop is extended to the take-up buggy has another drive roll 29'' located adjacent to it and the end of the supporting shaft 30' of the roll 29' at its end opposite that to which drive is transmitted the same as in the case of the roll 29 carries a pinion 171 which meshes with a pinion 172 supported on the shaft 30'' which carries and has fixed to it the drive roll 29'', whereby the rolls 29' and 29'' are both drive rolls. Still another roll 29''' is provided so that the belt may be trained properly with respect to the belt storage and extension arrangement. Thus increased belt wrap and proper belt reeve are provided.

It is possible to avoid the need for the reversing roller or idler 22, as may be seen by reference to Fig. 14 in which the top run 3 of the belt passes directly to a tandem pulley arrangement including pulleys 181 and 182 and from these around a wrap increasing idler 183 and a reversing and plane raising idler 184 to a run corresponding to the belt run 25 of Fig. 3. As the drive to the tandem pulley arrangement and the connection between the pulleys thereof will be readily understood from what has already been herein disclosed an additional figure will not be added to the drawings to illustrate the same.

It will be appreciated that as the distance between the take-up and drive buggies increases, suitable guiding and supporting means for the upper (3) and lower (4) runs of the belt loop will be needed at appropriate intervals. The lower run can be supported by rollers 200 journaled in a well-known manner on bases 201 positioned on the mine bottom beneath the run 4. Self-adjusting belt alining idler rollers such as are shown in Figs. 11 and 12 (the former furnished to illustrate a portion of each of the belt runs and their modes of support) are provided to guide and support and protect against running out of line the upper belt run 3. These comprise supporting brackets 205 on the cross bar 206 on which there is swiveled on a vertical axis at 207 a frame 208 having up-bent ends which provide supports 209 for the ends of belt supporting roller structures 210 desirably consisting of suitably spaced rolls 211 of rubber or neoprene mounted on a wire cable which is covered between the rollers by relatively thin rubber or neoprene sheaths 213 continuous with the rollers, and there being provided on upwardly extending arms 214 elements 215 engageable by the edges of the belt if the latter wanders somewhat out of line and then effective to swivel the frames 208 to cause the belt to be returned to centered position.

Figs. 9 and 10 show one arrangement of a tail pulley that is well suited to use upon a take-up buggy. This type of structure is unnecessary when the tail pulley is to be advanced rectilinearly, squared up, and fixed against swing. Moreover, the structure illustrated is, of course, not the only practicable arrangement, but is one that is well adapted for the purpose. A generally U-shaped frame 220 (U-shaped in plan) is pivotally connected for swinging in horizontal planes about an elongated vertical axis 221 relative to the frame 222 of the take-up buggy 2. It has suitably journaled on it, on a transverse horizontal axis located near the base of the U, an idler roller which is desirably lagged with helices of opposite turn at the opposite sides of its longitudinal center. Near the open end of the U are upper and lower guides 223 and 224 for the upper and lower runs of the conveyor belt 3 and 4. From a cross brace 225 which supports the guide 223 there is suspended a U-shaped frame portion 226 over which there extends a long tongue 227 connected with the U-shaped frame 220 and at the outbye end of which there is a bearing on which there is rotatably supported for turning between two working positions a bar which carries at its outer ends guide rollers 229 and 230 which may be positioned to coact with the sides of the upper run 3 of the belt loop 5 or the lower run 4 thereof, and be held in appropriate position for such coaction by a releasable locking pin 231. It will be evident that if the belt tends to run off to the side the structure described will assure its prompt and proper repositioning.

From the foregoing description it will be evident that by applying drive to pulley devices to which the active and return runs of a belt loop extend and between which a yieldable belt take-up and extension arrangement is connected it will be possible to cause the upper active belt run to convey material in either direction, that in case it be not desired to resort to plural roll drive for applying traction to the return run operativeness with but part turn cooperation between a power driven drive roller and the belt can be assured by application of suitable tension to the belt through the automatic take-up arrangement, and that if operation with relatively low belt tension is to be employed the use of plural drive rolls to exert a traction on the return run of the belt is possible.

While there are in this application specifically described one form and two modifications which the invention may assume in practice, it will be understood that this form and these modifications of the same are shown for purposes of illustration and that the invention may be further modified and embodied in various other forms without departing from its spirit or the scope of the appended claims.

What is claimed is:

1. In a belt conveyor, in combination, a frame, a belt-driving and extension unit including at least one belt-driving pulley adjacent one end of said frame, carriage guiding means extending along said frame, a carriage movable along said guiding means and carrying at least one direction-reversing belt-guiding pulley, at least one direction-reversing belt-guiding pulley journaled on said frame, and means for exerting a force to move said carriage away from said at least one direction-reversing belt-guiding pulley journaled on said frame, a tail pulley, a support for said tail pulley distinct from said first mentioned frame and movable bodily towards and from the latter and said belt-driving and extension unit, a belt having runs extending from said tail pulley respectively into driven relation to said at least one belt-driving pulley and to said at least one direction-reversing belt-guiding pulley adjacent said belt-driving unit, and means for selectively driving said at least one belt-driving pulley and said at least one direction-reversing belt-guiding pulley journaled on said frame to pull said runs alternatively around said tail pulley.

2. In a belt conveyor, an endless belt loop having upper and lower runs, pulley means for exerting a traction in an outbye direction on the upper run of said belt loop including at least one power rotatable drive pulley element, pulley means for exerting a traction in an outbye direction on said lower run including at least one power rotatable pulley element, a carriage reciprocable towards and away from said pulley elements, said carriage carrying at least one rotatable belt pulley element, a tail pulley element, a support for said tail pulley element movable bodily towards and from the said power rotatable pulley elements, said belt extending in an endless run from said tail pulley element around said other pulley elements and back to said tail pulley element in a continuous loop, and means for selectively applying a power drive to one or another of said power rotatable pulley elements to effect belt movement in opposite directions.

3. In a reversible extensible conveyor mechanism, an endless conveyor belt, a head pulley, a tail pulley, said belt passing around said pulleys, at least one of said pulleys being supported to be movable towards and away from the other of said pulleys so that the conveying length of belt therebetween is varied, guide devices over which the belt passes which are adjustable to compensate for variations in distance between the head pulley and the tail pulley to store the slack portion of the belt and to pay out the belt as needed, motor operated drive pulley means at the head end of said conveyor belt for selectively driving said belt in one direction, and motor operated drive pulley means in adjacency to said first mentioned drive pulley means for selectively driving said belt in a direction opposite to said one direction, and both of said drive pulley means acting directly on the belt independently of the stored up portion of said belt.

4. In a reversible extensible conveyor mechanism, an endless conveyor belt, a head pulley, a tail pulley, said pulleys disposed at the opposite ends of the mechanism and about which said belt passes, means for varying the effective length of the conveying run of said belt, a variable storing means embodied in the mechanism for receiving the slack portion of said belt produced as the conveying length of the belt is lessened, reversing motor operated means embodying drive elements spaced apart at one end of said mechanism adjacent said storing means for driving said belt in either of opposite directions, said driving elements engaging said belt between said head and tail pulleys, and means for effecting operation of said elements to effect conveying movements selectively in opposite directions of the conveying run of said belt.

5. In an extensible belt conveyor, a pair of frames between which movements of separation and approach may take place, an adjustable belt take-up and extension device on one of said frames, a moving pulley on the other of said frames, a continuous belt loop engaging said moving pulley and having upper and lower runs extending therefrom to said one frame, power rotatable pulleys supported by said one frame to which said runs respectively extend and about which they pass to said adjustable take-up and extension device, and selectable means for connecting said power rotatable pulleys, respectively, to drive said belt in opposite directions.

6. A reversible extensible belt conveyor mechanism comprising; a support; first and second belt driving means on said support; a belt supporting means secured to said support to be movable with relation to said first and second belt driving means to effect storage, take-up and paying-out of a multiple looped portion of an endless belt in lengths greater than the change in spacing between said belt supporting means and said first and second belt driving means, and means for selectively driving said first and second belt driving means to effect movement in either of opposite directions of a belt reeved around said first and second driving means and said belt supporting means.

7. A reversible extensible belt conveyor mechanism comprising, at least one first belt-engaging roller supported for rotation on an axis stationary with respect to a surface between points on which it is desired to move material and rotatable in one direction to drive a normally active load-carrying run of an endless conveyor belt, a second belt-engaging roller supported for rotation on an axis stationary with respect to said surface and rotatable in one direction to drive a normally return run of a conveyor belt, at least one belt reversing roller supported for bodily movement with respect to said first and second rollers, all of said rollers being located with respect to each other to receive a portion of an endless belt which is looped to store a variable length thereof, and means for selectively rotating said first and second rollers in said one directions selectively, to effect movement of a belt in either of opposite directions.

8. A reversible extensible belt conveyor mechanism comprising, at least one first belt-engaging roller supported for rotation on an axis stationary with respect to a surface between points on which it is desired to move material and rotatable in one direction to drive a normally active load-carrying run of an endless conveyor belt, a second belt-engaging roller supported for rotation on an axis stationary with respect to said surface and rotatable in one direction to drive a normally return run of a conveyor belt, a plurality of belt reversing rollers supported for bodily reciprocating movement with respect to said first and second rollers, said plurality of rollers being located with respect to each other and said first and second rollers to store and support a looped portion of an endless belt extending from said first and second rollers whereby the length of load-carrying run of a belt may be varied, and means for selectively rotating said first and second rollers in said one directions selectively, to effect movement of a belt in either of opposite directions independently of the looped portion thereof.

9. Reversible extensible belt conveying apparatus comprising, a frame, a pair of belt driving pulleys supported by said frame in spaced relationship so as to be adapted to effect driving of a normally conveying run and a normally return run of an endless belt, respectively, a belt storing and paying out means including a plurality of belt engaging pulleys reciprocably supported for bodily movement by said frame, all of said pulleys being spaced from each other to receive a portion of an endless belt which is looped to store a variable length thereof, and means for selectively driving said belt driving pulleys to effect movement of a belt in either of opposite directions.

10. Reversible extensible belt conveying apparatus comprising, a frame, a pair of belt driving pulleys supported by said frame in spaced relationship so as to be adapted to effect driving of a normally conveying run and a normally return run of an endless belt, respectively, a belt storing and paying out means including a plurality of belt engaging pulleys reciprocably supported for bodily movement by said frame, said plurality of pulleys being spaced from each other to receive a portion of an endless belt which is looped thereon; said belt driving pulleys being spaced from said plurality of pulleys to permit a belt to travel from one of said belt driving pulleys, to said plurality of pulleys and then the other of said belt driving pulleys, and means for selectively driving said belt driving pulleys to effect movement of a belt in either of opposite directions independently of the looped portion thereof.

11. In a reversible extensible conveyor mechanism, a frame, a cluster of pulleys on said frame, a second cluster of pulleys on said frame, both clusters having pulleys disposed on axes fixed as regards bodily movement relative to said frame, a third cluster of pulleys, means for mounting said third pulley cluster for bodily movement relative to said frame to effect extension of the effective run of an endless conveyor belt during movement of said pulley cluster in one direction and for taking in the belt slack during movement of said pulley cluster in the opposite direction to effect storage of such belt and shortening of the effective run of the belt, a first drive means for selectively driving a pulley of said first pulley cluster to effect drive of the effective conveying run of said belt in one direction, a second drive means for selectively driving a pulley of said second pulley cluster independently of said first drive means to effect drive of the effective conveying run of said belt in the direction opposite said one direction.

12. Reversible extensible belt conveying apparatus comprising, a frame, a pair of belt driving pulleys supported by said frame in spaced relationship to effect driving of a normally conveying run and a normally return run of an endless conveyor belt, repectively, a conveyor belt storing and paying-out means including a plurality of belt engaging pulleys reciprocably supported by said frame, said conveyor belt being guided for circulation relative to said frame and having a portion thereof reeved about the aforesaid pulleys to store a variable length thereof, said belt portion being reeved so that the same side thereof engages each of said driving pulleys, means for selectively rotatably driving either one of said belt driving pulleys whereby said conveyor belt is driven said conveyor belt engaging said belt driving pulleys to cause the other of said belt driving pulleys to rotate in the same direction as the driver of said belt driving pulleys rotates, and said selectable means being operative to selectively drive said belt driving pulleys in opposite directions.

13. Reversible extensible belt conveying apparatus comprising; a support; first and second belt driving means located on said support; a belt supporting means secured to said support to be movable with relation to said first and second belt driving means to effect storage, take-up and paying-out of an endless conveyor belt in lengths greater than the change in spacing between said belt supporting means and said first and second belt driving means, said conveyor belt having a portion thereof reeved about said first and second belt driving means and said belt supporting means so that the same side of said belt portion engages the outer surfaces of said first and second belt driving means, and means for selectively driving said first and second belt driving means to effect movement in either of opposite directions of said conveyor belt.

14. Reversible extensible conveying apparatus comprising; a support; first and second belt driving means located on said support; a belt supporting means secured to said support to be movable with relation to said first and second belt driving means to effect storage, take-up and paying-out of an endless conveyor belt in lengths greater than the change in spacing between said belt supporting means and said first and second belt driving means, said conveyor belt having a portion thereof reeved about said first and second belt driving means and said belt supporting means so that said conveyor belt travels from one of said belt driving means about said belt supporting means and then about the other of said belt driving means, and means for selectively driving said first and second belt driving means to effect movement of said conveyor belt in either of opposite directions independently of the portion of the conveyor belt reeved about said belt supporting means.

15. In a reversible extensible conveyor mechanism, a frame, a first cluster of pulleys on said frame, a second cluster of pulleys on said frame, said first and second pulley clusters having the pulleys thereof disposed on axes fixed as regards bodily movement relative to said frame, a third cluster of pulleys, an endless conveyor belt guided for movement relative to said frame and reeved about the pulleys of all of said pulley clusters, means for mounting said third pulley cluster for bodily movement relative to said frame to effect extension of the effective run of said conveyor belt during movement of said third pulley cluster in one direction and for taking in the belt slack during movement of said third pulley cluster in the opposite direction to effect storage of such belt and shortening of the effective run of the belt, a first selective drive means for driving a pulley of said first pulley cluster to effect drive of the effective conveying run of said belt in one direction, a second drive means for selective driving a pulley of said second pulley cluster independently of said first drive means to effect drive of the effective conveying run of said belt in the direction opposite said one direction.

References Cited in the file of this patent

UNITED STATES PATENTS

| | | |
|---|---|---|
| 769,947 | Kramer | Sept. 13, 1904 |
| 2,393,563 | Petterson | Jan. 22, 1946 |
| 2,452,980 | Beltz | Nov. 2, 1948 |

FOREIGN PATENTS

| | | |
|---|---|---|
| 626,579 | Great Britain | July 18, 1949 |
| 743,552 | Great Britain | June 23, 1954 |